United States Patent
Bucaro et al.

(10) Patent No.: US 12,305,861 B2
(45) Date of Patent: May 20, 2025

(54) COMBUSTOR WITH BAFFLE

(71) Applicant: GENERAL ELECTRIC COMPANY, Schenectady, NY (US)

(72) Inventors: Michael T. Bucaro, Arvada, CO (US); Clayton S. Cooper, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/597,287

(22) Filed: Mar. 6, 2024

(65) Prior Publication Data

US 2024/0210036 A1 Jun. 27, 2024

Related U.S. Application Data

(62) Division of application No. 17/694,978, filed on Mar. 15, 2022, now Pat. No. 11,940,151.

(60) Provisional application No. 63/298,749, filed on Jan. 12, 2022.

(51) Int. Cl.
  *F23R 3/28* (2006.01)
  *F23R 3/00* (2006.01)
  *F23R 3/06* (2006.01)
  *F23R 3/50* (2006.01)

(52) U.S. Cl.
  CPC ............. *F23R 3/286* (2013.01); *F23R 3/002* (2013.01); *F23R 3/06* (2013.01); *F23R 3/50* (2013.01)

(58) Field of Classification Search
  CPC .... F23R 3/002; F23R 3/06; F23R 3/46; F23R 3/50; F23R 3/286
  See application file for complete search history.

(56) References Cited

U.S. PATENT DOCUMENTS

| | | | |
|---|---|---|---|
| 2,475,911 | A | 7/1949 | Lewis |
| 2,493,641 | A | 1/1950 | Putz |
| 2,821,066 | A | 1/1958 | Stanley et al. |
| 3,077,073 | A | 2/1963 | Kuhrt |
| 4,062,182 | A | 12/1977 | Fehler et al. |
| 4,446,692 | A | 5/1984 | Adkins |
| 6,148,604 | A | 11/2000 | Salt et al. |
| 8,607,572 | B2 | 12/2013 | Koizumi et al. |
| 8,646,279 | B2 | 2/2014 | Schreiber et al. |

(Continued)

FOREIGN PATENT DOCUMENTS

| | | |
|---|---|---|
| CN | 102818292 A | 12/2012 |
| EP | 2206964 A2 | 7/2010 |

(Continued)

OTHER PUBLICATIONS

Chinese Office Action for Application No. 202210555547.2 dated Mar. 18, 2025 with English Translation, 18 pages total.

*Primary Examiner* — Arun Goyal
*Assistant Examiner* — Henry Ng
(74) *Attorney, Agent, or Firm* — McGarry Bair PC (57) ABSTRACT

A turbine engine and associated methods for a combustor as shown and described. The turbine engine including a combustor with a combustor liner having dilution openings and a geometry that changes along an axial direction. The combustor further having a baffle surrounding a combustor liner defining a combustion chamber of the combustor. A method for controlling nitrogen oxides within the combustor, including injecting compressed air into the annular combustion chamber through any of the dilution openings described herein.

20 Claims, 9 Drawing Sheets

(56) References Cited

U.S. PATENT DOCUMENTS

| | | | |
|---|---|---|---|
| 10,670,270 B2 | 6/2020 | Clemen | |
| 2005/0097890 A1 | 5/2005 | Ikeda et al. | |
| 2005/0198966 A1 | 9/2005 | Boardman | |
| 2011/0030377 A1* | 2/2011 | Lockyer | F23R 3/002 60/752 |
| 2011/0056205 A1 | 3/2011 | Carroni et al. | |
| 2011/0203286 A1 | 8/2011 | Wagner et al. | |
| 2012/0279224 A1 | 11/2012 | Bailey et al. | |
| 2014/0360156 A1* | 12/2014 | Miduturi | F23R 3/04 60/39.826 |
| 2015/0345796 A1 | 12/2015 | Carlson et al. | |
| 2018/0216536 A1 | 8/2018 | Bograd | |
| 2018/0274780 A1* | 9/2018 | Kim | F23R 3/10 |
| 2018/0298918 A1 | 10/2018 | Terauchi et al. | |
| 2019/0011131 A1 | 1/2019 | Roh et al. | |
| 2019/0017441 A1 | 1/2019 | Venkatesan et al. | |
| 2019/0162414 A1 | 5/2019 | Ogata et al. | |
| 2020/0318549 A1 | 10/2020 | Kalitzin et al. | |

FOREIGN PATENT DOCUMENTS

| | | |
|---|---|---|
| EP | 2902708 B1 | 2/2017 |
| EP | 2959229 B1 | 10/2020 |
| JP | 2016104990 A | 6/2016 |
| JP | 2021076065 A | 5/2021 |

\* cited by examiner

COMBUSTOR WITH BAFFLE

CROSS-REFERENCE TO RELATED APPLICATIONS

This application is a divisional of U.S. patent Ser. No. 17/694,978, filed Mar. 15, 2022, now U.S. Pat. No. 11,940,151, granted Mar. 26, 2024 which claims priority to U.S. Provisional Application Ser. No. 63/298,749, filed Jan. 12, 2022, both of which are incorporated herein by reference in their entirety.

TECHNICAL FIELD

The present subject matter relates generally to a combustor for a gas turbine engine, and, more specifically to a combustor for burning lighter than air fuel, alone, or in a mixture.

BACKGROUND

Turbine engines are driven by a flow of combustion gases passing through the engine to rotate a multitude of turbine blades, which, in turn, rotate a compressor to provide compress air to the combustor for combustion. A combustor can be provided within the turbine engine and is fluidly coupled with a turbine into which the combusted gases flow.

The use of hydrocarbon fuels in the combustor of a turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such petroleum-based fuels, or petroleum and synthetic fuel blends.

Standards stemming from air pollution concerns worldwide regulate the emission of $NO_x$, UHC, and CO generated as a result of the turbine engine operation. In particular, $NO_x$ is formed within the combustor as a result of high combustor flame temperatures during operation. It is desirable to decrease $NO_x$ emissions while still maintaining desirable efficiencies by regulating the profile and or pattern within the combustor.

DETAILED DESCRIPTION

Aspects of the disclosure described herein are directed to a combustor, and in particular a combustor with a baffle defining a sheltered zone proximate a fuel injector of the combustor. Further the combustor as described herein can include a combustion chamber having a primary zone with a transitional cross-section from a can to an annular profile. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" May be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" May be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is not limiting, rather a descriptor for locating parts described herein. Further, the term "proximate" means nearer or closer to the part recited than the following part. For example, a first hole proximate a wall, the first hole located upstream from a second hole means that the first hole is closer to the wall than the first hole is to the second hole.

Figure 1:
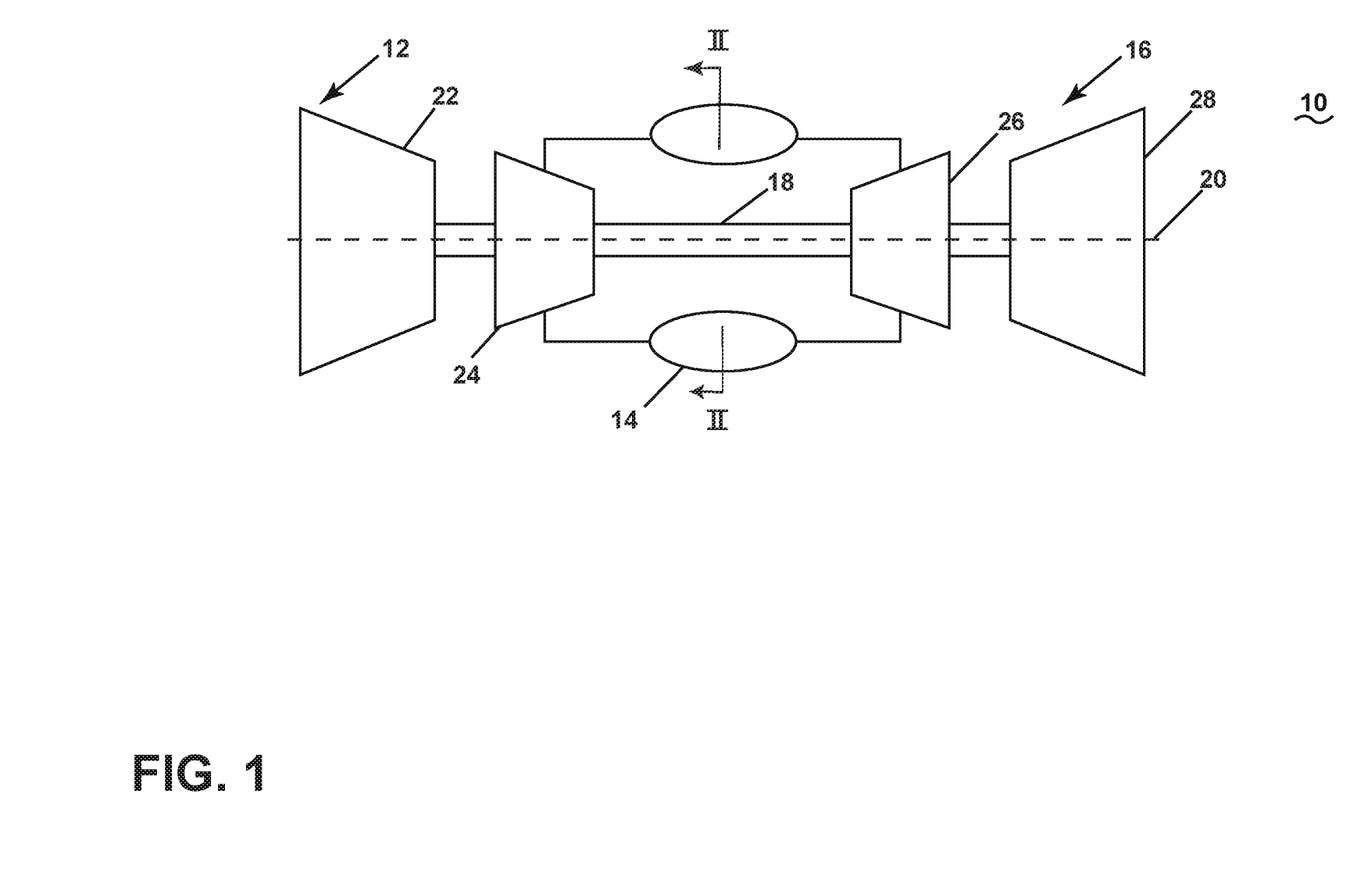
FIG. 1 is a schematic of a turbine engine.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis or centerline 20 for the turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
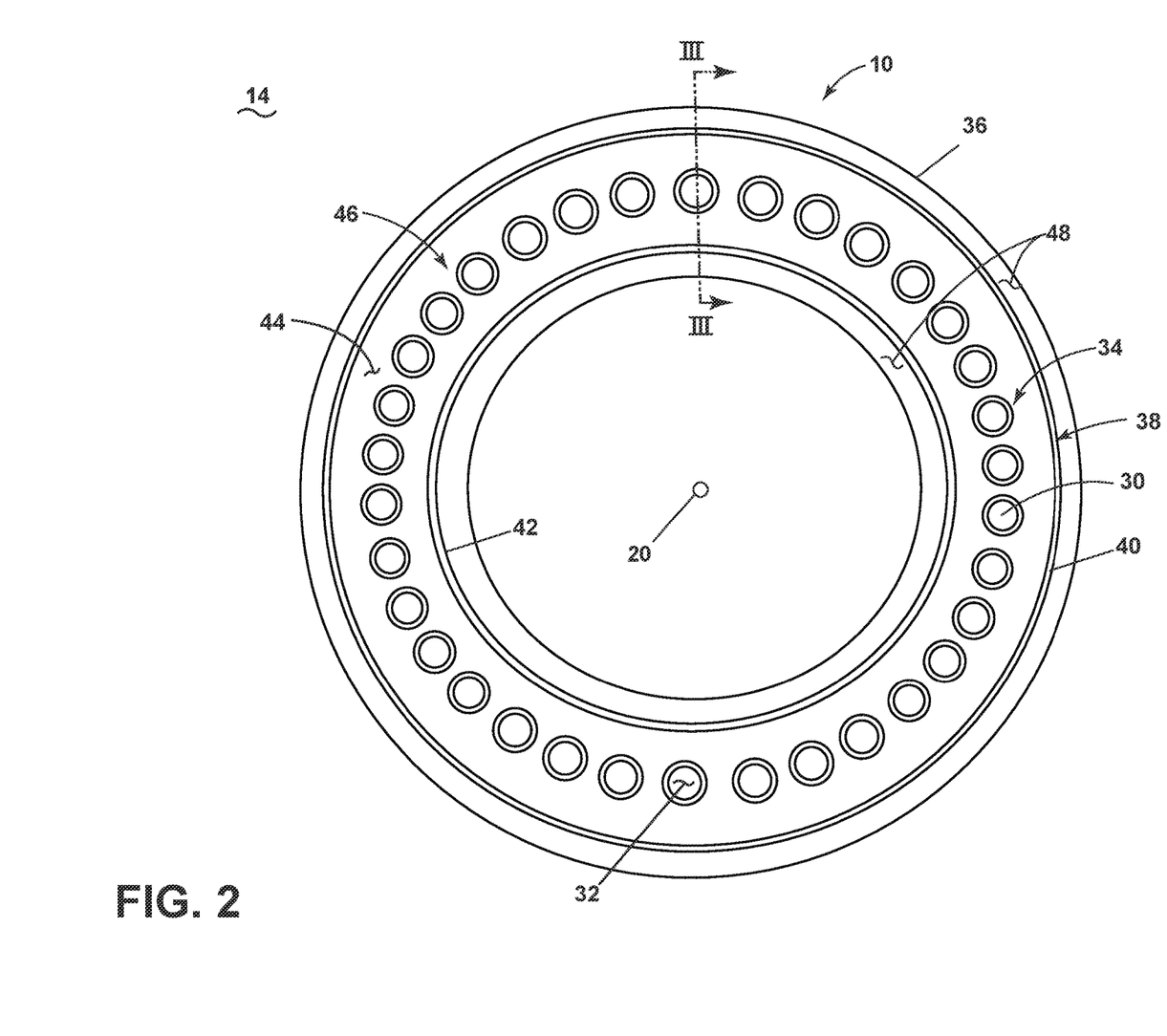
FIG. 2 depicts a cross-section view along line II-II of FIG. 1 of a combustion section of the turbine engine.

FIG. 2 depicts a cross-sectional view of the combustion section 14 along line II-II of FIG. 1. The combustion section 14 can include a set of fuel injectors 30 annularly arranged about the centerline 20 of the turbine engine 10. A combustor 34 is fluidly connected to the set of fuel injectors 30 to define at least a portion of a set of fuel cups 32. The set of fuel cups 32 can include rich cups, lean cups, or a combination of both rich and lean cups annularly provided about the engine centerline 20. It should be appreciated that the annular arrangement of fuel injectors 30 can be one or multiple fuel injectors 30 and one or more of the fuel injectors 30 can have different characteristics.

A combustor liner 38 including an outer combustor liner 40 and an inner combustor liner 42 concentric with respect to each other and annular about the engine centerline 20 defines the combustor 34. The combustor liner 38 also further defines the set of fuel cups 32. A dome wall 44 together with the combustor liner 38 can define a combustion chamber 46 of the combustor 34 annular about the engine centerline 20. The set of fuel cups 32 can be fluidly coupled to the combustion chamber 46.

The combustor 34 can have a can, can-annular, or annular arrangement depending on the type of engine in which the combustor 34 is located. The combustor liner 38 can have a varying geometry as further described herein. The combustor 34 can be fully encased by a casing 36. A compressed air passageway 48 can be defined at least in part by both the combustor liner 38 and the casing 36.

Figure 3:
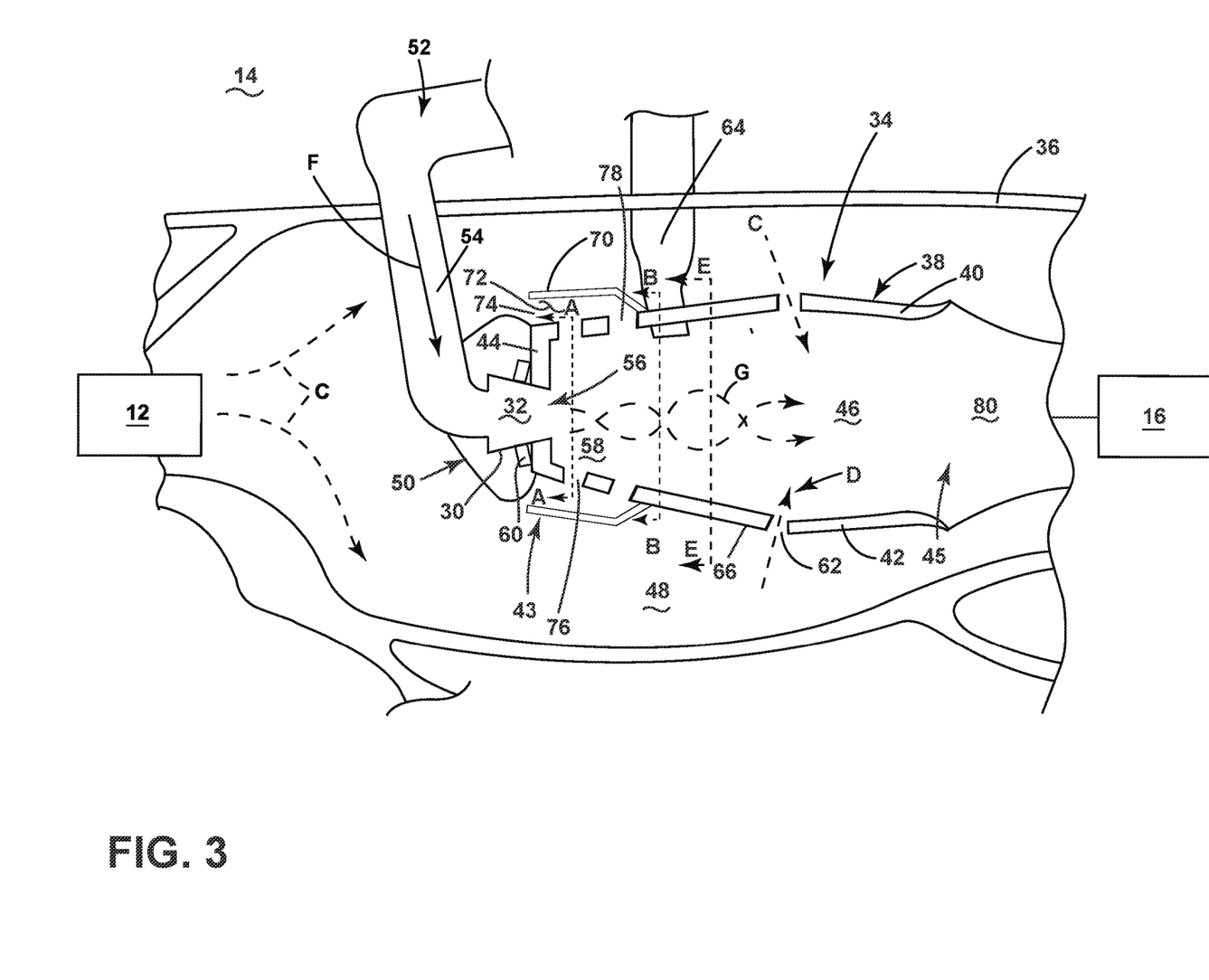
FIG. 3 is a cross-sectional view along line III-III of FIG. 2 of a combustor in the combustion section with a baffle defining a sheltered zone.

FIG. 3 depicts a cross-sectional view taken along line III-III of FIG. 2 illustrating the combustion section 14. A dome assembly 50 can house the fuel injector 30. The fuel injector 30 can be fluidly coupled to a fuel inlet 52 via a fuel passageway 54 that can be adapted to receive a flow of fuel (F). Compressed air (C) can be provided to the combustion section 14 from the compressor section 12 via the compressed air passageway 48. The fuel injector 30 can terminate in a dome inlet 56 to define the fuel cup 32. The dome inlet 56 can further define along with the combustor liner 38, at least a portion of a primary zone 58 in the combustion chamber 46. A swirler 60 can be fluidly coupled to the fuel injector 30. A first set of dilution openings 62 can be provided in the combustor liner 38 for connecting the compressed air passageway 48 and the combustion chamber 46. At least one igniter 64 can be coupled to the combustor liner 38.

A baffle 70 can be mounted to an outer surface 66 of the combustor liner 38 surrounding the primary zone 58. The baffle 70 can be spaced from the combustor liner 38 to define a sheltered zone 72 with a shelter zone inlet 74. The baffle 70 can direct a specific amount of compressed air (C) for usage along the combustor liner 38. A second set of dilution openings 76 can be provided in the combustor liner 38 for fluidly connecting the sheltered zone 72 to the primary zone 58 of the combustion chamber 46. A third set of dilution openings 78 can be provided in the combustor liner 38 downstream of the second set of dilution openings 76 for connecting a different portion of the sheltered zone 72 to the primary zone 58 of the combustion chamber 46. The first, second, and third sets of dilution openings can be round or shaped holes, slots, or annular gaps and designed to form radial or angled air jets.

During operation, compressed air (C) can be fed into the fuel injector 30 and mixed with fuel (F) to define a fuel/air mixture. The mixture can be ignited within the combustion chamber 46 by the at least one igniter 64 to generate combustion gas (G). The swirler 60 can swirl incoming compressed air (C) with fuel (F) entering the fuel cup 32 to provide a homogeneous mixture of air and fuel entering the combustion chamber 46 via the dome inlet 56.

Further, compressed air (C) can be fed into the sheltered zone 72 via the shelter zone inlet 74. Compressed air (C) can be utilized as dilution jets provided through both the second and third set of dilution openings 76, 78. The primary zone 58 between the second and third set of dilution openings 76, 78 can define an extension of the at least one fuel cup 32. The baffle 70 provides the sheltered zone 72 for the fuel cup 32 such that the primary zone 58 operates similarly to an individual can combustor arrangement. The baffle 70 allows for stability of a single one of the fuel cups 32 by minimizing cup to cup interaction.

Compressed air (C) can additionally enter the combustion chamber 46 via the first set of dilution openings 62 to provide a dilution flow (D) within the combustion chamber 46. The combustion gas (G) can be mixed using the dilution flow (D) or simply controlled by the dilution flow (D) to move through a combustor outlet 80 and exit into the turbine section 16.

Figure 4:
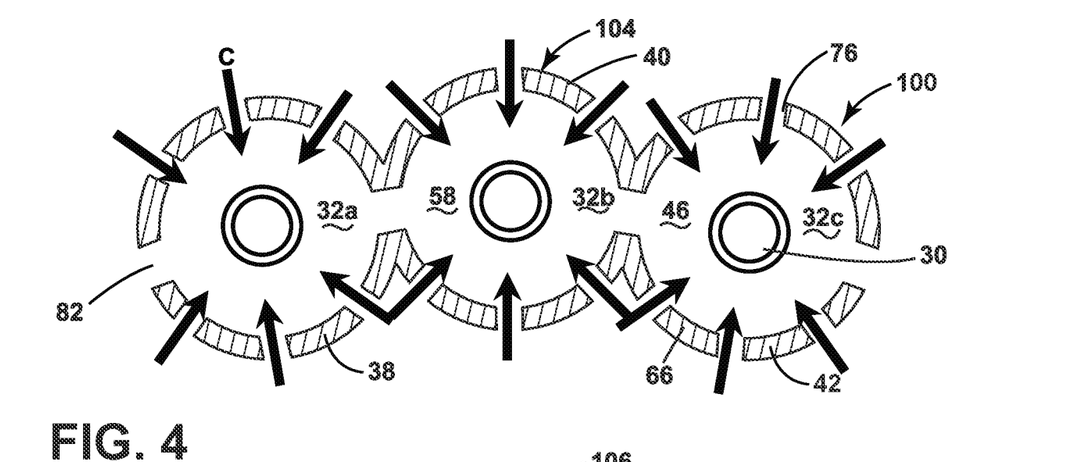
FIG. 4 is a schematic of a portion of the combustor taken along line A-A of FIG. 3.
Figure 5:
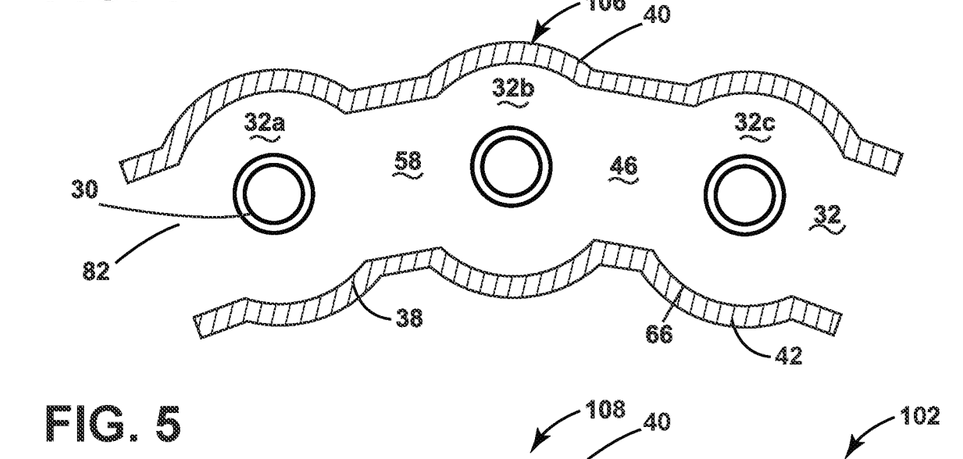
FIG. 5 is a schematic of a portion of the combustor taken along line B-B of FIG. 3.
Figure 6:
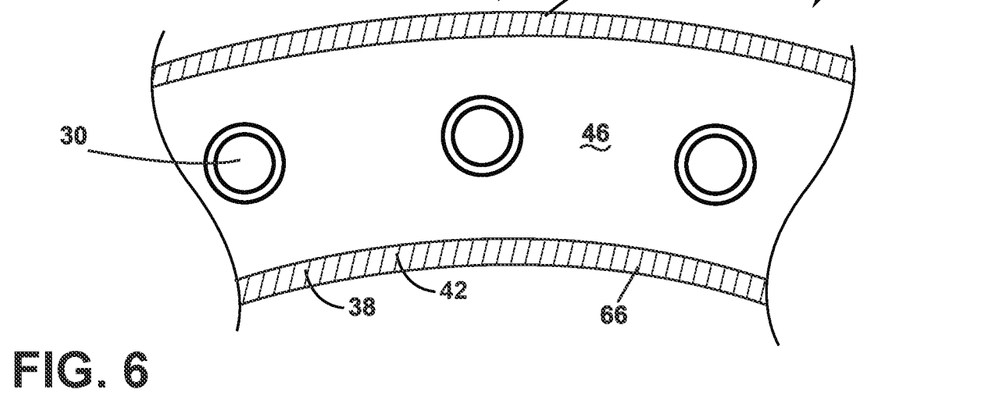
FIG. 6 is a schematic of a portion of the combustor taken along line E-E of FIG. 3.

FIGS. 4-6 illustrate varying cross-sections of the combustor 34 at varying locations moving axially from a first end 43 at the dome wall 44 toward a second end 45 at the combustor outlet 80. As illustrated in FIGS. 4-6, the combustor liner 38 has a transitional geometry. The combustor liner 38 transitions from a defined cup geometry 100 (FIG. 4) proximate the set of fuel injectors 30 to an annular geometry 102 (FIG. 6) axially downstream the set of fuel injectors 30. The defined cup geometry meaning the combustor liner 38 is rounded in a cylindrical shape to define distinguishable cups. More specifically the geometry of the combustor liner 38 transitions from a modified can shape 104 (FIG. 4) to a can-annular shape 106 (FIG. 5) to an annular shape 108 (FIG. 6).

FIG. 4 is a cross-sectional view facing multiple fuel injectors 30 along line A-A of FIG. 3 looking toward the first end 43 and illustrating the modified can shape 104. The second set of dilution openings 76 can include multiple dilution openings annular about the fuel cup 32. The combustor liner 38 can be shaped to define distinct fuel cups, a first fuel cup 32a, a second fuel cup 32b, and a third fuel cup 32c fluidly connected to each other by a spacing of the inner and outer combustor liners 40, 42 defining circumferentially spaced openings 82. The modified can shape 104 is defined as having the openings 82 that are small enough to define the plurality of discrete, circumferentially-spaced, fuel cups 32a, 32b, 32c while still enabling a fluid connection between the distinct fuel cups 32a, 32b, 32c. The baffle 70 (FIG. 3) described herein enables proper feeding of compressed air (C) to the second and third sets of dilution openings 76, 78 in the sheltered zone 72 (FIG. 3) to produce operation similar to that of an individual can combustor while geometrically shaped with the modified can shape 104.

FIG. 5 is a cross-sectional view facing multiple fuel injectors 30 along line B-B of FIG. 3 just downstream from the third set of dilution openings 78. The circumferentially spaced openings 82 can gradually widen as the combustor liner 38 extends downstream toward the second end 45 between line A-A and line B-B of FIG. 3. It can be appreciated that the combustor liner 38 at line B-B is shaped such that the distinct rich fuel cups 32a, 32b, 32c are still distinguishable but more fluidly dynamic with respect to each other. In this manner, the geometry of the combustor liner 38 transitions to define a combustor 34 with a modified can shape 104 at line A-A to a can-annular shape 106 at line B-B.

FIG. 6 is a cross-sectional view facing multiple fuel injectors 30 along line E-E of FIG. 3 just downstream from line B-B. The circumferentially spaced openings 82 (FIGS. 4 and 5) are no longer distinguishable. It can be appreciated that the combustor liner 38 at line E-E is shaped such that the distinct fuel cups 32a, 32b, 32c (FIGS. 4 and 5) are no longer distinguishable and the combustion chamber 46 is annular about the engine centerline 20 (FIG. 2). The outer and inner combustor liners 40, 42 at line E-E are circular in shape and annular about the engine centerline 20 (FIG. 2). In this manner, the geometry of the combustor liner 38 transitions to define a combustor 34 with a can-annular shape 106 at line B-B to an annular shape 108 at E-E.

Figure 7:
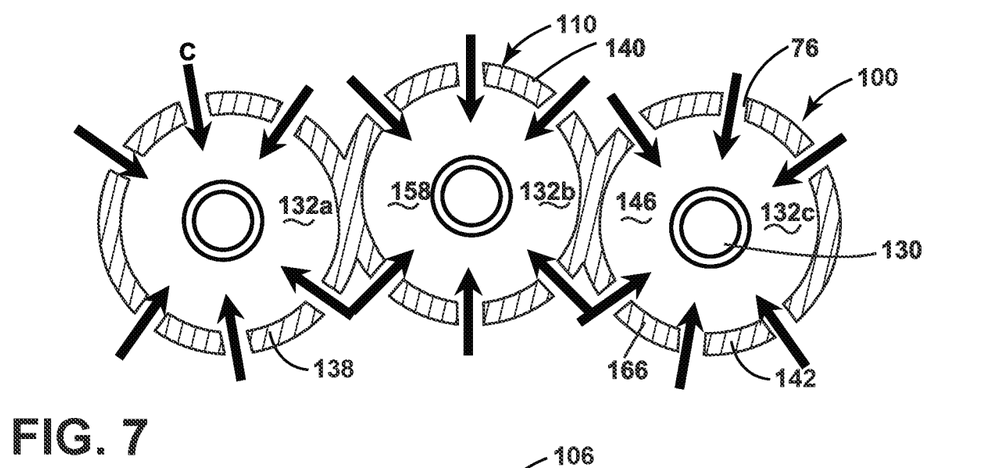
FIG. 7 is a variation of the portion of the combustor taken along line A-A of FIG. 3.
Figure 8:
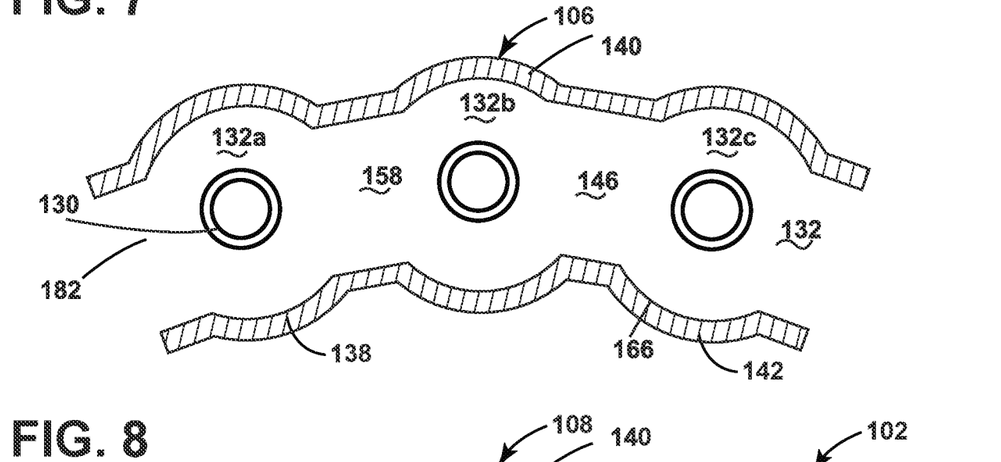
FIG. 8 is the portion of the combustor taken along line B-B of FIG. 3.
Figure 9:
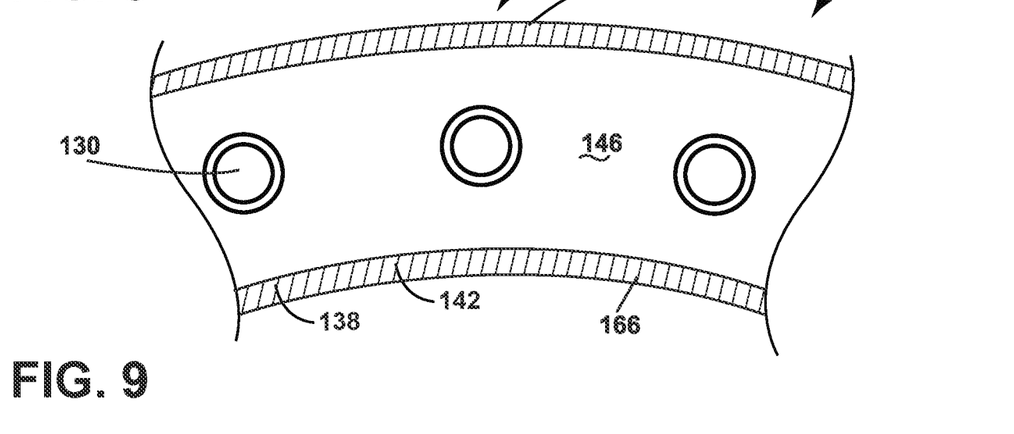
FIG. 9 is the portion of the combustor taken along line E-E of FIG. 3.

FIGS. 7-9 illustrates varying cross-sectional schematics of the combustor 34 according to another aspect of the disclosure herein. Moving axially from the first end 43 at the dome wall 44 toward the second end 45 at the combustor outlet 80, a combustor liner 138 has a transitional geometry. The combustor liner 138 is substantially similar to the combustor liner 38, therefore, like parts will be identified with like numerals increased by 100. It should be understood that the description of the like parts of the combustor liner 38 applies to the combustor liner 138 unless otherwise noted.

The geometry of the combustor liner 138 transitions from a can shape 110 (FIG. 7) to a can-annular shape 106 (FIG. 8) to an annular shape 108 (FIG. 9). The can shape 110 (FIG. 7) is defined as having no openings such that the combustor liner 138 defines a plurality of discrete, circumferentially-spaced, fuel cups 132a, 132b, 132c without a fluid connection between the distinct fuel cups 132a, 132b, 132c at the first end 43. More specifically inner and outer combustor liners 140, 142 of the combustor liner 138 meet to physically separate rich fuel cups 132a, 132b, 132c at line A-A (FIG. 3). While at line B-B (FIG. 3), the inner and outer combustor liners 140, 142 are separated to define a set of spaced openings 182, in turn defining the can-annular shape 106 (FIG. 8). It can be appreciated that the combustor liner 138 at line E-E (FIG. 3) is shaped such that the distinct fuel cups 132a, 132b, 132c (FIGS. 7 and 8) are no longer distinguishable, in turn defining the combustion chamber 146 in the annular shape 108 (FIG. 9).

Figure 10:
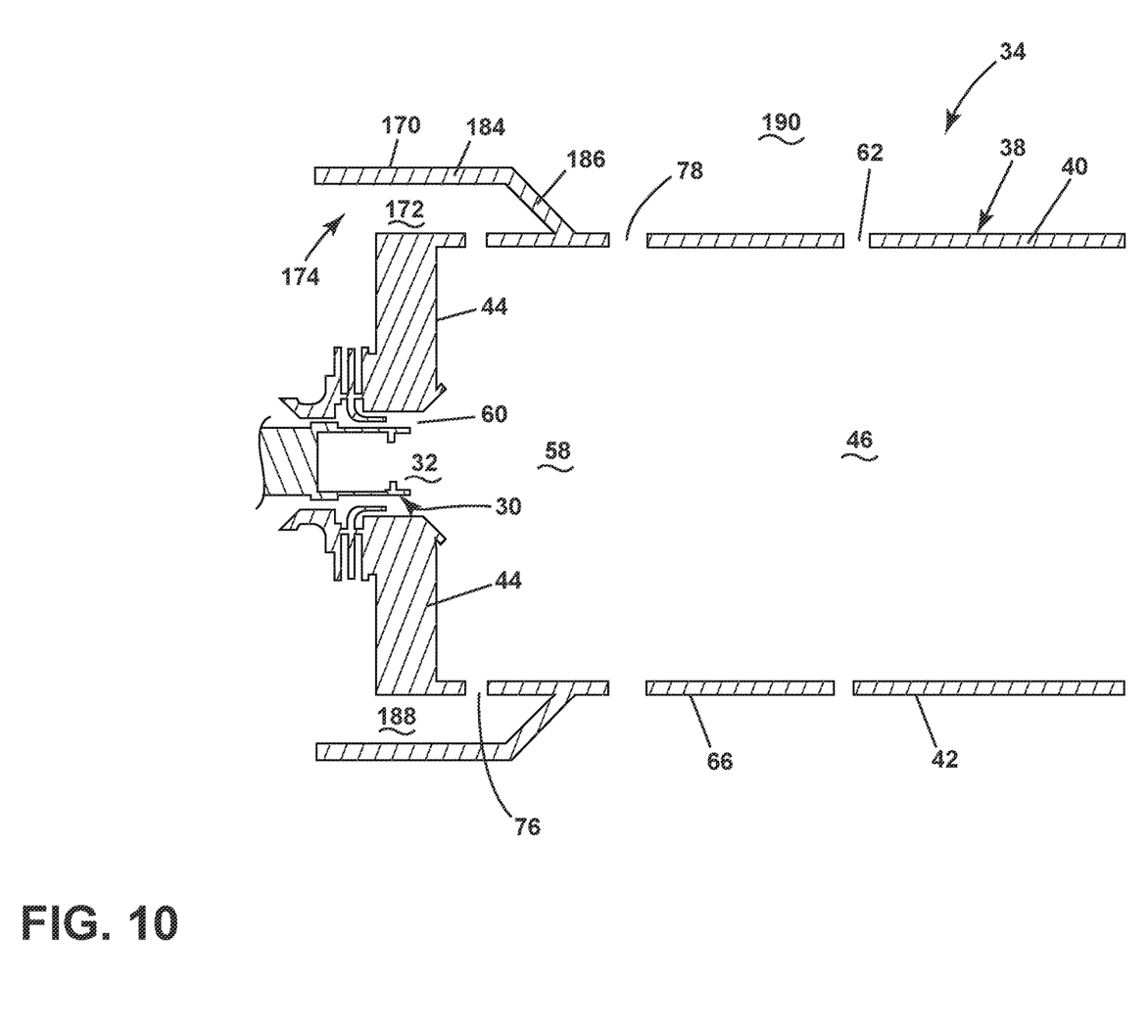
FIG. 10 is an enlarged view of a portion of the combustor of FIG. 3 illustrating a set of acoustic dampers located within the sheltered zone.

FIG. 10 schematic of exemplary combustor 34 illustrating a variation of the baffle 70 according to an aspect of the disclosure herein. A baffle 170 is substantially similar to the baffle 70, therefore, like parts will be identified with like numerals increased by 100. It should be understood that the description of the like parts of the baffle 70 applies to the baffle 170 unless otherwise noted.

The baffle 170 can be spaced from the outer surface 66 of the combustor liner 38 to define a sheltered zone 172. The baffle 170 can include a body 184 extending axially from a mounting leg 186. The baffle 170 can be mounted to the outer surface 66 of the combustor liner 38 at the mounting leg 186. The mounting leg 186 can be mounted to the outer surface 66 between the second and third set of dilution openings 76, 78. The body 184 can be spaced from the outer surface 66 proximate the dome wall 44 to define a shelter zone inlet 174 fluidly coupled to the sheltered zone 172.

The baffle 170 can divide the area around the combustor 34 into a total pressure zone 188 and a static pressure zone 190. During operation the total pressure zone 188 feeds the second set of dilution openings 76, while static pressure zone 190 feeds the third set of dilution openings 78. It is contemplated that any number of dilution openings are part of the first set of dilution openings 62, which can also be fed by the static pressure zone 190.

Figure 11:
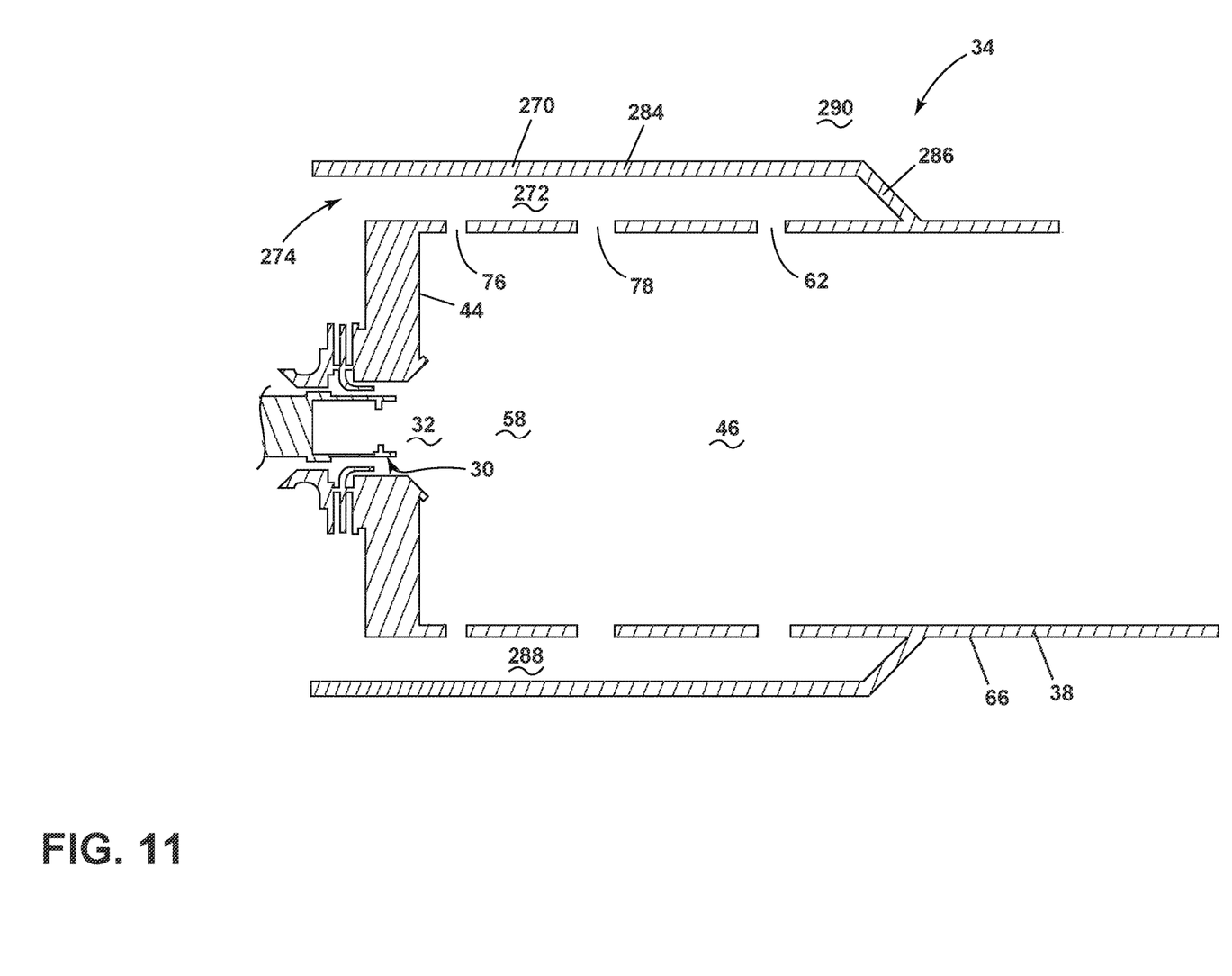
FIG. 11 is schematic of a portion of a combustor in a cross-sectional view, similar to the combustor of FIG. 3, with a baffle defining a sheltered zone according to another aspect of the disclosure herein.

FIG. 11 is a schematic of exemplary combustor 34 illustrating a variation of the baffle 70 according to another aspect of the disclosure herein. A baffle 270 is substantially similar to the baffle 70, therefore, like parts will be identified with like numerals increased by 200. It should be understood that the description of the like parts of the baffle 70 applies to the baffle 170 unless otherwise noted.

The baffle 270 can be spaced from the outer surface 66 of the combustor liner 38 to define a sheltered zone 272. The baffle 270 can include a body 284 extending axially from a mounting leg 286. The baffle 270 can be mounted to the outer surface 66 of the combustor liner 38 at the mounting leg 286. The body 284 can be spaced from the outer surface 66 proximate the dome wall 44 to define a shelter zone inlet 274 fluidly coupled to the sheltered zone 272. The mounting leg 286 can be mounted to the outer surface 66 downstream of the first set of dilution openings 62.

The baffle 270 can divide the area around the combustor 34 into a total pressure zone 288 and a static pressure zone 290. During operation the total pressure zone 288 feeds first, second, and third sets of dilution openings 62, 76, 78 described herein. Feeding the dilution openings described herein with total or static pressure enables tuning of an amount of pressure drop across the dilution openings. This amount of pressure drop is directly related to an amount of penetration of the compressed air (C) as a dilution jet in the combustion chamber 46. This tuning has been demonstrated to impact emissions.

Figure 12:
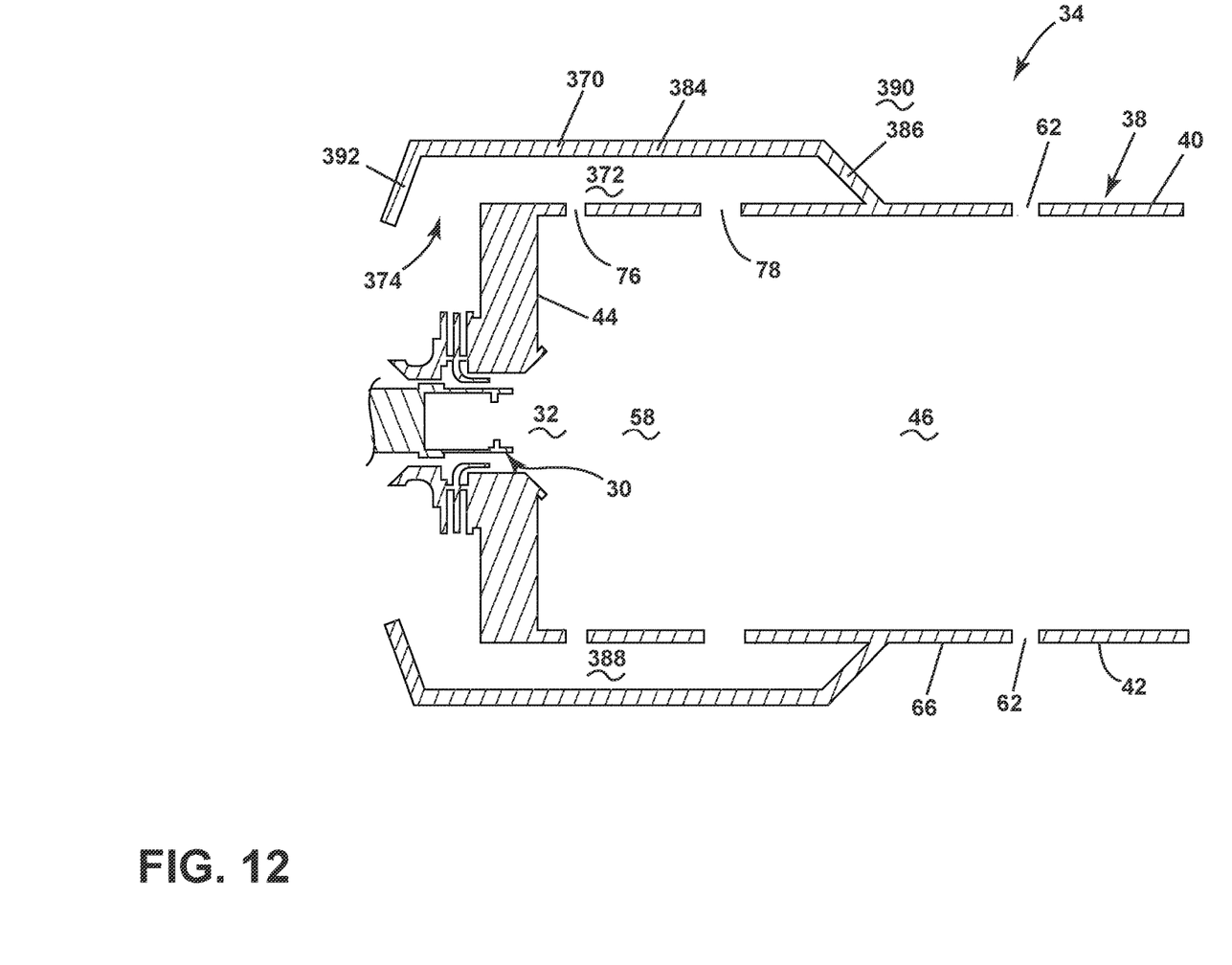
FIG. 12 is schematic of a portion of a combustor in a cross-sectional view, similar to the combustor of FIG. 3, with a baffle defining a sheltered zone according to yet another aspect of the disclosure herein.

FIG. 12 is a schematic of exemplary combustor 34 illustrating a variation of the baffle 70 according to another aspect of the disclosure herein. A baffle 370 is substantially similar to the baffle 70, therefore, like parts will be identified with like numerals increased by 300. It should be understood that the description of the like parts of the baffle 70 applies to the baffle 370 unless otherwise noted.

The baffle 370 can be spaced from the outer surface 66 of the combustor liner 38 to define a sheltered zone 372. The baffle 370 can include a body 384 extending axially between a mounting leg 386 and an inlet leg 392. The baffle 370 can be mounted to the outer surface 66 of the combustor liner 38 at the mounting leg 386. The inlet leg 392 can be spaced from the dome wall 44 to define a shelter zone inlet 374 fluidly coupled to the sheltered zone 372. The baffle 370 can have a substantially trapezoidal shape in cross-section where the shelter zone inlet 374 is located along a base of the trapezoidal shape.

The baffle 370 can divide the area around the combustor 34 into a total pressure zone 388 and a static pressure zone 390. During operation the total pressure zone 388 feeds second and third sets of dilution openings 76, 78, while static pressure zone 390 feeds the first set of dilution openings 62. As previously described, feeding the dilution openings with total or static pressure enables tuning of an amount of pressure drop across the dilution openings. While illustrated with respect to the baffle 370, it should be understood that the inlet leg 392 described herein can be associated with any of the baffles 70, 170, 270 described herein.

Figure 13:
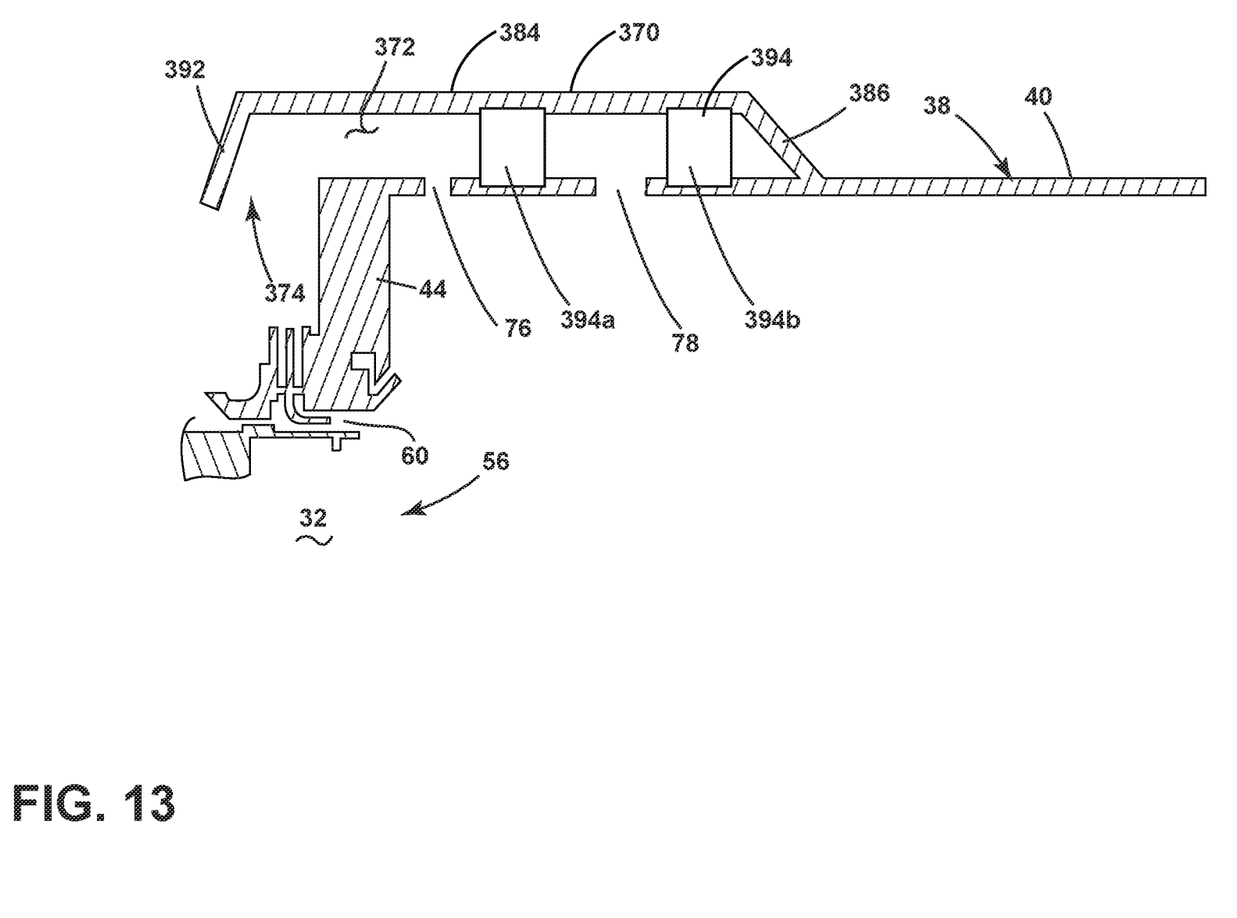
FIG. 13 is schematic of a portion of a combustor in a cross-sectional view, similar to the combustor of FIG. 3, with a baffle defining a sheltered zone according to yet another aspect of the disclosure herein.

Turning to FIG. 13, an enlarged view of the baffle 370 according to another aspect of the disclosure herein is illustrated. At least one acoustic damper 394 can be provided in the sheltered zone 372 and extend radially from the outer surface 66 to the body 384. The at least one acoustic damper 394 can be multiple dampers, a first acoustic damper 394a placed between the second and third set of dilution openings 76, 78 and a second acoustic damper 394b placed downstream from the third set of dilution openings 78 and upstream from the mounting leg 386.

The baffle 370 provides a coupling between the acoustic damper 394 and a source of acoustic pressure caused by acoustic dynamics associated with chamber volume, heat release variation during combustion, and swirler flow vorticity. The acoustic damper 394 can be provided to reduce pressure fluctuations at specific frequencies. The acoustic damper 394 can dampen an associated amplitude of the specific frequencies. The acoustic damper 394 can also be called a Helmholtz resonator. The size of the damper is directly related to the acoustic frequency. The acoustic damper 394 is especially beneficial in combustors with relatively high amplitudes associated with the specific frequencies. While illustrated with respect to the baffle 370, it should be understood that the acoustic dampers described herein can be located in any of the baffles 70, 170, 270 described herein Any combination of the arrangements with regard to the baffles described herein are contemplated. The rich cup and lean cup arrangements can be in any form described herein.

A method for controlling nitrogen oxides, or $NO_x$ present in combustion gases (G) within the combustor, includes injecting compressed air (C) into the combustion chamber through any of the dilution openings described herein. The method can further includes swirling the compressed air (C) with fuel (F) before injection into the combustion chamber. Mixing the compressed air (C) with the fuel (F) can occur in the primary zone. The method can further include transitioning the flow of combustion gasses (G) through the primary zone 58 to the combustor outlet 80 from distinguishable cups 32 to a single annular geometry 102. The transition in combustor liner geometry can also be utilized for controlling a flame of the fuel/air mixture in the primary zone 58.

Benefits associated with the baffle and transitional geometry of the combustor liner and methods described herein are a reduction and/or elimination of CO emissions. Further, the transitional geometry of the combustor liner contributes to flame control. The baffle and positioning of said baffle described herein also contributes to controlling the flame produced by $H_2$ fuel to achieve lower $NO_x$, lower dynamics and better component life.

While described with respect to a turbine engine, it should be appreciated that the combustor as described herein can be for any engine with a having a combustor that emits $NO_x$. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine comprising a compressor section, combustion section, and turbine section in serial flow arrangement, the combustion section comprising an annular combustion chamber having a first end and a second end, wherein the second end is spaced from the first end; a plurality of fuel cups located at the first end and annularly arranged within the annular combustion chamber, wherein at least one of the plurality of fuel cups has a defined cup geometry; and a combustor liner at least partially defining the annular combustion chamber and having a varying cross-section extending in an axial direction from the first end toward the second end, the varying cross-section defining at the first end at least a portion of the defined cup geometry and at the second end a single annular geometry.

The gas turbine engine of any preceding clause wherein the defined cup geometry is a modified can shape defining a plurality of discrete, circumferentially-spaced, fuel cups fluidly connected to each other proximate the first end The gas turbine engine of any preceding clause wherein the defined cup geometry is a can shape defining a plurality of discrete, circumferentially-spaced, fuel cups fluidly separate from each other proximate the first end.

The gas turbine engine of any preceding clause wherein the combustor liner is shaped to define a can-annular shape downstream from the first end and upstream from the second end.

The gas turbine engine of any preceding clause, further comprising at least one set of dilution openings in the combustor liner.

The gas turbine engine of any preceding clause, further comprising a baffle mounted to an outer surface of the combustor liner to define a sheltered zone.

The gas turbine engine of any preceding clause wherein the at least one set of dilution openings fluidly connects the sheltered zone to the annular combustion chamber.

The gas turbine engine of any preceding clause wherein the at least one set of dilution openings is multiple sets of dilution openings axially spaced from each other along the combustor liner.

The gas turbine engine of any preceding clause wherein the at least one set of dilution openings is at least two sets of dilution openings axially spaced from each other along the combustor liner.

The gas turbine engine of any preceding clause wherein the baffle is mounted to the outer surface between the at least two sets of dilution openings.

The gas turbine engine of any preceding clause wherein at least one set of dilution openings fluidly connect the sheltered zone to the annular combustion chamber.

The gas turbine engine of any preceding clause wherein the baffle comprises a body extending axially between a mounting leg and an inlet leg and the baffle is mounted to the outer surface of the combustor liner at the mounting leg and the inlet leg is spaced from the first end to define a shelter zone inlet fluidly coupled to the sheltered zone.

The gas turbine engine of any preceding clause wherein the baffle comprises an axially extending body.

The gas turbine engine of any preceding clause wherein a mounting leg extends from the body.

The gas turbine engine of any preceding clause wherein the mounting leg is mounted to the combustor liner and the body is spaced from the combustor liner to define a sheltered zone.

The gas turbine engine of any preceding clause wherein the baffle divides an area around the combustor into a total pressure zone and a static pressure zone wherein the total pressure zone and the sheltered zone are on in the same.

The gas turbine engine of any preceding clause wherein at least one set of dilution openings is fed by the total pressure zone and another set of dilution openings is fed by the static pressure zone.

The gas turbine engine of any preceding clause wherein all of the dilution openings are fed by the total pressure zone.

The gas turbine engine of any preceding clause wherein an inlet leg extends from the body to further define the sheltered zone and a shelter zone inlet.

A combustor comprising an annular combustion chamber having a first end and a second end, wherein the second end is spaced from the first end; a plurality of fuel cups located at the first end and annularly arranged within the annular combustion chamber, wherein at least some of the plurality of fuel cups have a defined cup geometry; and a combustor liner at least partially defining the annular combustion chamber and having a varying cross-section extending in a direction downstream from the first end toward the second end, the varying cross-section defining at the first end at least a portion of the defined cup geometry for the fuel cups and at the second end a single annular geometry.

The combustor of any preceding clause wherein the defined cup geometry is a modified can shape defining a plurality of discrete, circumferentially-spaced, fuel cups fluidly connected to each other proximate the first end.

The combustor of any preceding clause wherein the defined cup geometry is a can shape defining a plurality of discrete, circumferentially-spaced, fuel cups fluidly separate from each other proximate the first end.

The combustor of any preceding clause wherein the combustor liner is shaped to define a can-annular shape downstream from the defined cup geometry and upstream from the single annular geometry.

The combustor of any preceding clause, further comprising at least one set of dilution openings in the combustor liner and a baffle mounted to an outer surface of the combustor liner to define a sheltered zone, at least one set of the at least one set of dilution openings fluidly connecting the sheltered zone to the annular combustion chamber.

A method for controlling nitrogen oxides present within a combustor of a turbine engine, the method comprising injecting a fuel and a compressed air mixture into a combustion chamber of the combustor through a fuel injector; mixing the compressed air and the fuel to define a fuel/air mixture; igniting the fuel/air mixture in a primary zone of the combustion chamber to define a flame and to generate combustion gasses; flowing the combustion gasses through the combustion chamber from a plurality of circumferentially spaced, discrete cups to a single annular geometry; and exhausting the combustion gasses at a combustor outlet.

The method of any preceding clause, further comprising controlling a flame of the fuel/air mixture in the primary zone by feeding compressed air into a sheltered zone defined by a baffle mounted to an outer surface of the combustor.

The method of any preceding clause, further comprising reducing pressure fluctuations at specific frequencies with an acoustic damper located within the sheltered zone.

The method of any preceding clause, further comprising feeding a set of dilution openings from the sheltered zone.

The method of any preceding clause, further comprising feeding a set of dilution openings from a static pressure zone.

The method of any preceding clause, further comprising feeding a set of dilution openings from a total pressure zone.

What is claimed is:

1. A gas turbine engine having an engine centerline, the gas turbine engine comprising:
    a compressor section, a combustion section, and a turbine section in serial flow arrangement, the combustion section comprising:
        a combustion chamber having a dome wall at a first end and a combustor outlet at a second end, wherein the second end is spaced from the first end; and
        a combustor liner extending axially from the first end to the second end, the combustor liner comprising an inner liner and an outer liner together at least partially defining the combustion chamber as having a can shape at the first end of the combustion chamber and an annular shape at the second end of the combustion chamber, the can shape defining a plurality of discrete, circumferentially-spaced, fuel cups fluidly separate from each other proximate the first end; and
        wherein the inner liner and the outer liner meet at the first end to physically separate the plurality of discrete, circumferentially-spaced, fuel cups, and the inner liner and the outer liner gradually radially separate in a downstream axial direction, with respect to the engine centerline, to the second end.

2. The gas turbine engine of claim 1, wherein the inner liner and the outer liner are spaced, at a location downstream from the first end and upstream from the second end, to define a set of spaced openings.

3. The gas turbine engine of claim 1, wherein the combustor liner is shaped to define a can-annular shape downstream from the first end and upstream from the second end.

4. The gas turbine engine of claim 1, further comprising at least one set of dilution openings in the combustor liner.

5. The gas turbine engine of claim 4, further comprising a baffle mounted to an outer surface of the combustor liner to define a sheltered zone.

6. The gas turbine engine of claim 5, wherein the at least one set of dilution openings fluidly connects the sheltered zone to the combustion chamber.

7. The gas turbine engine of claim 5, wherein the at least one set of dilution openings is at least two sets of dilution openings axially spaced from each other along the combustor liner.

8. The gas turbine engine of claim 7, wherein the baffle is mounted to the outer surface between the at least two sets of dilution openings.

9. The gas turbine engine of claim 8, wherein the at least two sets of dilution openings fluidly connect the sheltered zone to the combustion chamber.

10. The gas turbine engine of claim 5, wherein the baffle comprises a body extending axially between a mounting leg and an inlet leg and the baffle is mounted to the outer surface of the combustor liner at the mounting leg and the inlet leg is spaced from the first end to define a shelter zone inlet fluidly coupled to the sheltered zone.

11. A combustor comprising:
a combustion chamber having a dome wall at a first end and a combustor outlet at a second end, wherein the second end is spaced from the first end; and
a combustor liner comprising an inner liner and an outer liner together at least partially defining the combustion chamber as having a can shape at the first end of the combustion chamber and an annular shape at the second end of the combustion chamber, the can shape defining a plurality of discrete, circumferentially-spaced, fuel cups fluidly separate from each other proximate the first end and wherein the plurality of discrete, circumferentially-spaced, fuel cups, are fluidly coupled downstream of the first end; and
wherein the inner liner and the outer liner meet at the first end to physically separate the plurality of discrete, circumferentially-spaced, fuel cups, and the inner liner and the outer liner gradually radially separate in a downstream axial direction, with respect to an engine centerline, to the second end.

12. The combustor of claim 11, wherein the inner liner and the outer liner are spaced, at a location downstream from the first end and upstream from the second end, to define a set of spaced openings.

13. The combustor of claim 11, wherein the combustor liner is shaped to define a can-annular shape downstream from the first end and upstream from the second end.

14. The combustor of claim 1, further comprising at least one set of dilution openings in the combustor liner and a baffle mounted to an outer surface of the combustor liner to define a sheltered zone, the at least one set of dilution openings fluidly connecting the sheltered zone to the combustion chamber.

15. A method for controlling nitrogen oxides present within a combustor of a gas turbine engine, the method comprising:
injecting a fuel and a compressed air into a combustion chamber of the combustor through a fuel injector, wherein the combustion chamber has a dome wall at a first end and a combustor outlet at a second end;
mixing the compressed air and the fuel to define a fuel/air mixture;
igniting the fuel/air mixture in a primary zone of the combustion chamber to define a flame and to generate combustion gasses;
flowing the combustion gasses through the combustion chamber from the plurality of discrete, circumferentially-spaced, fuel cups, wherein the plurality of discrete, circumferentially-spaced, fuel cups are physically separated by where an inner liner and an outer liner meet at the first end of the combustion chamber, and the inner liner and the outer liner gradually radially separate in a downstream axial direction, with respect to an engine centerline, defining a single annular geometry at the second end of the combustion chamber; and
exhausting the combustion gasses at the combustor outlet.

16. The method of claim 15, further comprising controlling a flame of the fuel/air mixture in the primary zone by feeding compressed air into a sheltered zone defined by a baffle mounted to an outer surface of the combustor.

17. The method of claim 15, wherein the inner liner and the outer liner are spaced, at a location downstream from the first end and upstream from the second end, to define a set of spaced openings.

18. The method of claim 15, wherein the combustor further comprises at least one set of dilution openings in a combustor liner.

19. The method of claim 18, wherein the gas turbine engine further comprises a baffle mounted to an outer surface of the combustor liner to define a sheltered zone.

20. The method of claim 19, wherein the at least one set of dilution openings fluidly connects the sheltered zone to the combustion chamber.

* * * * *